US012770230B2

(12) United States Patent
Cook et al.

(10) Patent No.: US 12,770,230 B2
(45) Date of Patent: Oct. 20, 2026

(54) SYSTEMS AND METHODS FOR IMPLEMENTING A BLUR VISUAL EFFECT

(71) Applicant: Canva Pty Ltd, Surry Hills (AU)

(72) Inventors: Christopher James Cook, Ryde (AU); Oliver Daniel Richards, Northbridge (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/945,552

(22) Filed: Nov. 13, 2024

(65) Prior Publication Data

US 2025/0384531 A1 Dec. 18, 2025

(30) Foreign Application Priority Data

Jun. 17, 2024 (AU) ................................ 2024204101

(51) Int. Cl.
*G06T 5/70* (2024.01)
*G06T 7/11* (2017.01)
*G06T 7/143* (2017.01)

(52) U.S. Cl.
CPC .................. *G06T 5/70* (2024.01); *G06T 7/11* (2017.01); *G06T 7/143* (2017.01); *G06T 2207/10024* (2013.01); *G06T 2207/20076* (2013.01)

(58) Field of Classification Search
CPC ... G06T 5/70; G06T 7/11; G06T 7/143; G06T 2207/10024; G06T 2207/20076
See application file for complete search history.

(56) References Cited

U.S. PATENT DOCUMENTS

| | | | | |
|---|---|---|---|---|
| 8,629,868 B1 | 1/2014 | Gardiner et al. | | |
| 11,120,528 B1 | 9/2021 | Seely et al. | | |
| 2010/0098350 A1* | 4/2010 | Zimmer | .................... | G06T 5/20 382/264 |

(Continued)

FOREIGN PATENT DOCUMENTS

| | | | |
|---|---|---|---|
| CN | 110599577 B | 11/2020 | |
| CN | 110417539 B | 4/2023 | |

OTHER PUBLICATIONS

Examination Report No. 1 for Australian Application No. 2024204101 mailed Jul. 5, 2024, pp. 1-8.

(Continued)

*Primary Examiner* — Jianxun Yang
(74) *Attorney, Agent, or Firm* — GrowIP Law Group LLC

(57) ABSTRACT

Described herein is a computer implemented method including: accessing source image data defining a set of source pixels for an image; selecting a first target pixel from a set of one or more target pixels, the set of one or more target pixels corresponding to one or more unique source pixels of the set of source pixels; and generating a first output pixel corresponding to the first target pixel. Generating the first output pixel is by: determining a set of sample points having a sample point distribution within a blur sample area corresponding to an area of the image, wherein the sample point distribution has a central skew towards the first target pixel; determining a set of sample point appearance values based on the sample points and the image; determining a first blur appearance value based on the set of sample point appearance values; and generating the first output pixel based on the first blur appearance value.

18 Claims, 6 Drawing Sheets

(56) References Cited

U.S. PATENT DOCUMENTS

| | | | | |
|---|---|---|---|---|
| 2013/0121606 | A1 * | 5/2013 | Chien | G06T 5/77<br>382/260 |
| 2013/0230259 | A1 | 9/2013 | Intwala et al. | |
| 2014/0177963 | A1 | 6/2014 | Wachsmuth et al. | |
| 2020/0143520 | A1 | 5/2020 | Suszek | |
| 2022/0156887 | A1 | 5/2022 | Lin et al. | |
| 2023/0014805 | A1 | 1/2023 | Verma et al. | |

OTHER PUBLICATIONS

Kim, M., "Shape and Luminance Cues for the Visual Perception of Glow", York University, Toronto, Canada, published 2011 < URL: https://www.collectionscanada.gc.ca/obj/thesescanada/vol2/002/MR80450.PDF?is_thesis=1&oclc_number=879939601 >, pp. 1-123.

Patterson, S., "How To Create Twirl Art In Photoshop", photoshopessentials.com, published Jul. 13, 2024, per Wayback machine https://web.archive.org/web/20240713124107/https://www.photoshopessentials.com/photo-effects/twirl-arteffect/, (last visited Jul. 28, 2025), pp. 1-36.

Patterson, S., "Radial Blur Action Effect In Photoshop", photoshopessentials.com, published Jun. 17, 2024 per Wayback machine https://web.archive.org/web/20240617205259/https://www.photoshopessentials.com/photo-effects/radialblur-action-effect-photoshop/, (last visited Jul. 28, 2025), pp. 1-14.

* cited by examiner

SYSTEMS AND METHODS FOR IMPLEMENTING A BLUR VISUAL EFFECT

CROSS-REFERENCE TO RELATED APPLICATION

This application is a U.S. Non-Provisional application that claims priority to Australian Patent Application No. 2024204101, filed Jun. 17, 2024, which is hereby incorporated by reference in its entirety.

TECHNICAL FIELD

Aspects of the present disclosure are directed to systems and methods for implementing a blur visual effect on a digital image or a portion of a digital image.

BACKGROUND

Digital images can be processed in a huge variety of ways. Such processing may be performed in order to try and improve the appearance of an image by applying one or more image effects and/or to alter an image, for example to introduce blur.

In many cases, applying an image effect such as blur to a digital image involves pixel-level processing. In view of the extremely detailed resolution that digital images often possess, pixel-level processing of such images can be processor intensive. Therefore, processing will either take a long time or, to be done in a timely fashion, it will necessitate very powerful processors. Practically speaking, various devices of varying levels of processing power may be used to carry out image processing and, therefore, different user and device requirements must be considered.

SUMMARY

Described herein is a computer implemented method including: accessing source image data defining a set of source pixels for an image; selecting a first target pixel from a set of one or more target pixels, the set of one or more target pixels corresponding to one or more unique source pixels of the set of source pixels; and generating a first output pixel corresponding to the first target pixel by: determining a set of sample points having a sample point distribution within a blur sample area corresponding to an area of the image, wherein the sample point distribution has a central skew towards the first target pixel; determining a set of sample point appearance values based on the sample points and the image; determining a first blur appearance value based on the set of sample point appearance values; and generating the first output pixel based on the first blur appearance value.

Also described herein is a computer implemented method including: accessing source image data defining a set of source pixels; selecting a first target pixel from a set of one or more target pixels, the set of one or more target pixels corresponding to a unique source pixel of the set of source pixels; and generating a first output pixel corresponding to the first target pixel by: determining a set of sample point points; determining a first blur appearance value based on the set of sample points; and generating the first output pixel based on the first target pixel and the first blur value.

Also described herein is a computer implemented method for blurring a source image defined by a set of source pixels, the method including: for each of a plurality of pixels in the set of source pixels generating an output pixel by: for a plurality of sample points having a sample point distribution about a respective pixel: determining a sample point appearance value for each said sample point, wherein the sample point appearance value for a sample point is, or is based on, a pixel appearance value for each of one or more pixels in the set of source pixels that are located at or near that sample point; determining a first blur appearance value based on the sample point appearance values; and generating the output pixel based on the first blur appearance value; and forming a blurred image using the generated output pixels; wherein the sample point distribution about the respective pixel spans an area of the source image and the pixels corresponding to the sample points are less than all the pixels in the area.

Figure 1:
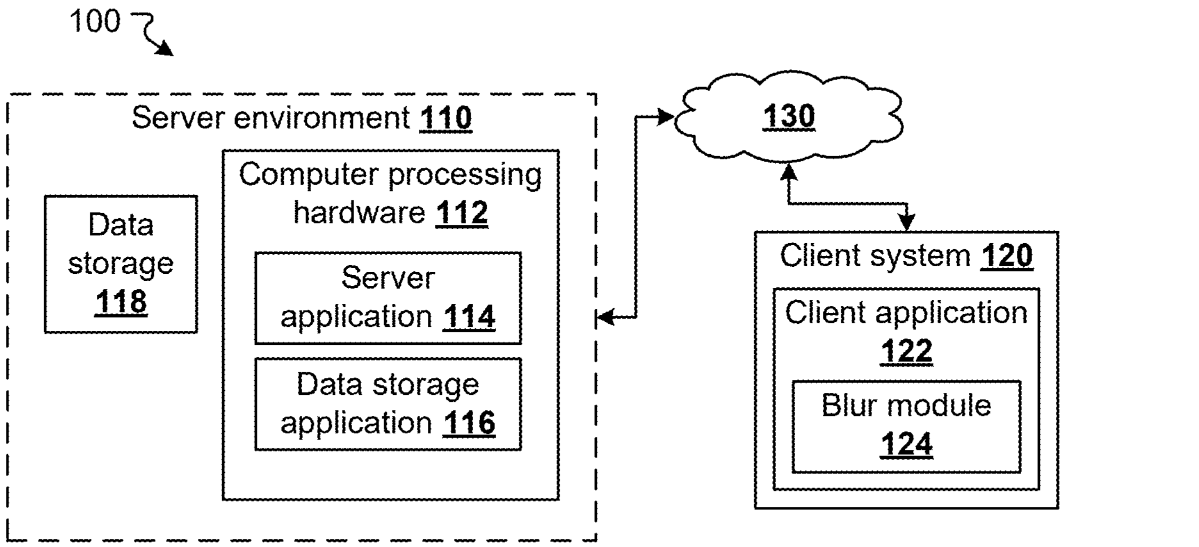
FIG. 1 is a diagram depicting a networked environment in which various features of the present disclosure may be performed.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is generally concerned with implementing a blur visual effect on a digital image or a portion of a digital image.

As discussed above, users may wish to alter a digital image by applying a blur effect on an image to improve the appearance of the image and/or to alter an image in an artistic fashion. A variety of blur effects are known, including a Gaussian blur, a box blur and a radial blur, amongst others.

A Gaussian blur effect may be produced by applying a Gaussian function to the pixels of an image, that is applying a convolution with a Gaussian kernel on the image. Techniques for producing an exact variable intensity Gaussian blur can be computationally intensive.

A user may request a blur effect via a graphical user interface that provides a blur brush tool. In the context of the present specification, a blur brush tool is a type of selection tool that allows a user to apply a blur effect to selected area(s) of a digital image using an input device—e.g. using a mouse or other cursor control device to blur a selected area or to use a touch screen to blur a selected area. The blur brush tool will generally include a selector of a chosen pixel width or diameter, for example a circular cursor displayed on a graphical user interface to indicate an area selectable using the blur brush tool, although it may also take the form of alternate shapes. In some instances, the blur brush tool will operate to select a feathered area or otherwise implement a feathering effect at its edges, so as to provide a transition zone between an area of the blur brush tool that provides the full blur effect, generally a centrally disposed major portion of the area selected using the blur brush tool, and an outer bound of the area selected using the blur brush tool. This transition area provides a gradual blurring effect that bridges the outer bound and the centrally disposed portion of the blur brush tool.

The intensity of the blurring effect of the blur brush tool may be selected by the user. This selection may be made prior to use of the tool. In this case, the blur brush tool brushes the selected area of the digital image which are blurred at the selected blur intensity as the area is being selected, such that the blur is applied and rendered in real-time. Alternatively or in addition, the user may select the blur intensity after the blur brush tool is used. In this case, the brushed area of the digital image is firstly selected by the user and then, as a discrete subsequent step, the blur effect is applied to the entirety of the selected area.

In other embodiments, other selection tools may be used. For example, an area selection tool allows a user to define an area on the digital image. In various forms, such a tool may allow the user to define an area based on a predefined shape (such as a rectangle or ellipse) or additionally or alternatively allow the user to define an area based on a freeform area selection. Following the selection of the area the blur effect may then be applied. This may occur either upon completion of the area being defined or upon a separate actuation of the blur effect. In the latter case, the area selection tool may be a general purpose or multi-purpose area selection tool allows a user to perform actions other than a blur effect on the defined area, for example a cut or copy function.

The features of the present disclosure are described in the context of a design platform. In the described embodiments, this platform includes server-side and client-side applications which operate to perform the various techniques described herein. One example of such a platform will be described with reference to networked environment 100 of FIG. 1.

Networked environment 100 includes a server environment 110 and a client system 120 which communicate via one or more communications networks 130 (e.g. the Internet).

Generally speaking, the server environment 110 includes computer processing hardware 112 (discussed below) on which applications that provide server-side functionality to client applications (such as client application 122 described below) execute. In the present example, server environment 110 includes a server application 114 and a data storage application 116.

In the present embodiment, the server application 114 executes to provide a client application endpoint that is accessible over communications network 130. For example, where server application 114 serves web browser client applications the server application 114 will be a web server which receives and responds (for example) to HTTP requests. Where server application 114 serves native client applications, server application 114 will be an application server configured to receive, process, and respond to specifically defined API calls received from those client applications. The server environment 110 may include one or more web server applications and/or one or more application server applications allowing it to interact with both web and native client applications.

In the present example, server application 114 (and or other applications of server environment 110) facilitate various functions related to creating and editing documents and designs. This may include, for example, document and design creation, editing, storage, searching, retrieval, publication, and viewing. The server application 114 (and/or other applications) may also facilitate additional functions that are typical of server systems—for example user account creation and management, user authentication, and/or other server side functions.

In the present example, the data storage application 116 operates to receive and process requests to persistently store and to retrieve data that is relevant to the operations performed and/or services provided by the server environment 110. Such requests may be received from the server application 114, other server environment applications, and/or (in some instances) directly from client applications such as 122. Data relevant to the operations performed/services provided by the server environment 110 may include, for example, user account data, image data (which may include, for example, image, document and/or deck records defining images and designs that have been created by users), and/or other data relevant to the operation of the server environment 110.

The data storage application 116 may, for example, be a relational database management application or an alternative application for storing and retrieving data from data storage 118. Data storage 118 may be any appropriate data storage device (or set of devices), for example one or more non transitory computer readable storage devices such as hard disks, solid state drives, tape drives, or alternative computer readable storage devices.

In server environment 110, server application 114 persistently stores data to data storage device 118 via the data storage application 116. In alternative implementations, however, the server application 114 may be configured to directly interact with data storage devices such as 118 to store and retrieve data (in which case a separate data storage application may not be needed). Furthermore, while a single data storage application 116 is described, server environment 110 may include multiple data storage applications. For example one data storage application 116 may be used for user account data, another for image data and so forth. In this case, each data storage application may interface with one or more shared data storage devices and/or one or more dedicated data storage devices, and each data storage application may receive/respond to requests from various server-side and/or client-side applications (including, for example server application 114).

As noted, the server environment 110 applications run on (or are executed by) computer processing hardware 112. Computer processing hardware 112 includes one or more computer processing systems. The precise number and nature of those systems will depend on the architecture of the server environment 110.

For example, in one implementation each server environment application may run on its own dedicated computer processing system. In another implementation, two or more server environment applications may run on a common/shared computer processing system. In a further implementation, server environment 110 is a scalable environment in which application instances (and the computer processing hardware 112—i.e. the specific computer processing systems required to run those instances) are commissioned and decommissioned according to demand—e.g. in a public or private cloud-type system. In this case, server environment 110 may simultaneously run multiple instances of each application (on one or multiple computer processing systems) as required by client demand. Where server environment 110 is a scalable system it will include additional applications to those illustrated and described. As one example, the server environment 110 may include a load balancing application which operates to determine demand, direct client traffic to the appropriate server application instance 114 (where multiple server applications 114 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environment 110 may be by any appropriate means, for example direct communication or networked communication over one or more local area networks, wide area networks, and/or public networks (with a secure logical overlay, such as a VPN, if required).

Client system 120 hosts a client application 122 which, when executed by the client system 120, configures the client system 122 to provide client-side functionality/interact with server environment 110 (or, more specifically, the server application 114 and/or other applications provided by the server environment 110). Client application 122 includes a blur module 124. Via the client application 122 and in particular blur module 124, and as discussed in detail below, a user can access the various techniques described herein. In will be appreciated that in alternate arrangements, blur module 124 and/or the functionality that it provides (discussed in detail below) may be independent of client application 122, i.e. part of another separate application of client system 120.

Client application 122 may also provide a user with access to additional design and document related operations, such as creating, editing, saving, publishing, sharing, and/or other design and document related operations. Via the client application 122, a user can perform various operations such as creating, editing, saving, retrieving/accessing, publishing, and sharing documents and designs. Such operations may be performed solely by client application 122, or may involve the client application 122 communicating with the server environment 110 for processing to be performed there (e.g. by the server application 114).

The client application 122 may be a general web browser application which accesses the server application 114 via an appropriate uniform resource locator (URL) and communicates with the server application 114 via general world-wide-web protocols (e.g. http, https, ftp). Alternatively, the client application 122 may be a native application programmed to communicate with server application 114 using defined application programming interface (API) calls and responses.

A given client system such as 120 may have more than one client application 122 installed and executing thereon.

For example, a client system 120 may have a (or multiple) general web browser application(s) and a native client application.

In the environment of FIG. 1, and the embodiments described below, various processing is described as being performed by different applications and modules thereof—e.g. server application 114, data storage application 116, and client application 122 having blur module 124. It will be appreciated, however, that in most cases the processing that is described could be performed by alternative applications or modules, and that such applications or modules may run either at a client system such as 120 or at a server environment such as 110. As one example, the techniques described herein may be provided as part of a stand-alone application in which case all processing and data storage may be performed by a single computer processing system (which is configured by one or more applications or modules).

As noted, the techniques and operations described herein are performed by one or more computer processing systems.

By way of example, client system 120 may be any computer processing system which is configured (or configurable) by hardware and/or software—e.g. client application 122—to offer client-side functionality. A client system 120 may be a desktop computer, laptop computer, tablet computing device, mobile/smart phone, or other appropriate computer processing system.

Similarly, the applications of server environment 110 are also executed by one or more computer processing systems. Server environment computer processing systems will typically be server systems, though again may be any appropriate computer processing systems.

Figure 2:
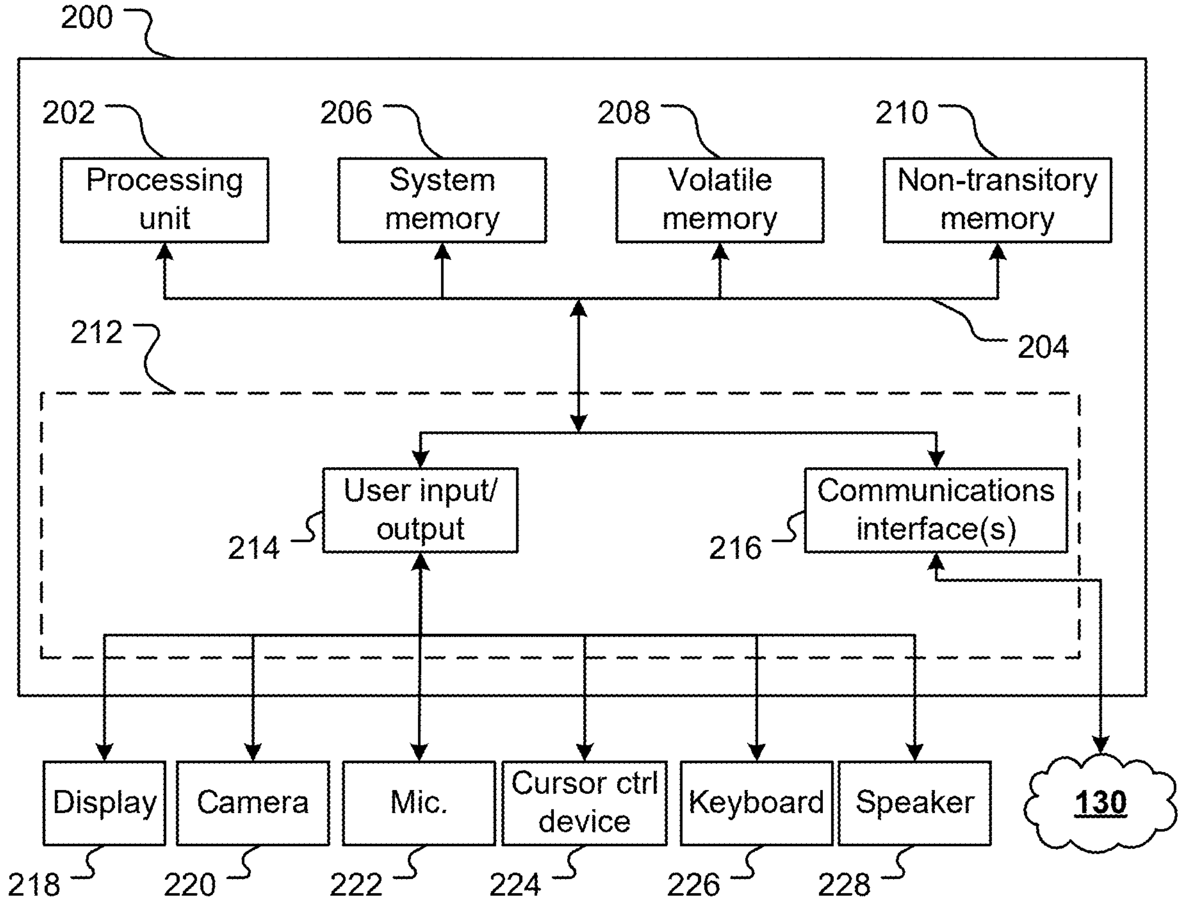
FIG. 2 is a block diagram of an example computer processing system.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine readable storage (memory) devices which store computer readable instructions and/or data which are executed by the processing unit 202 to control operation of the processing system 200. In this example system 200 includes a system memory 206 (e.g. a BIOS), volatile memory 208 (e.g.

random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Generally speaking, and depending on the particular system in question, devices to which system 200 connects—whether by wired or wireless means—include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboard, mouse, trackpad, microphone, accelerometer, proximity sensor, GPS, and/or other input devices. System 200 may also include or connect to one or more output devices controlled by system 200 to output information. Such output devices may include devices such as a display (e.g. a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, where system 200 is a client system such as 120 it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

System 200 also includes one or more communications interfaces 216 for communication with a network, such as network 130 of environment 100 (and/or a local network within the server environment 110). Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, and referring to the networked environment of FIG. 1 above, server environment 110 includes one or more systems which run a server application 114 and a data storage application 116. Similarly, client system 120 runs a client application 122.

In the present disclosure, client application 122 configures the client system 120 to provide a user interface including a graphical user interface (GUI). The GUI allows a user to access and cause other functionality described herein to be performed. The client application may also include GUIs to allow a user to create, edit, and output documents including digital images.

Figure 3:
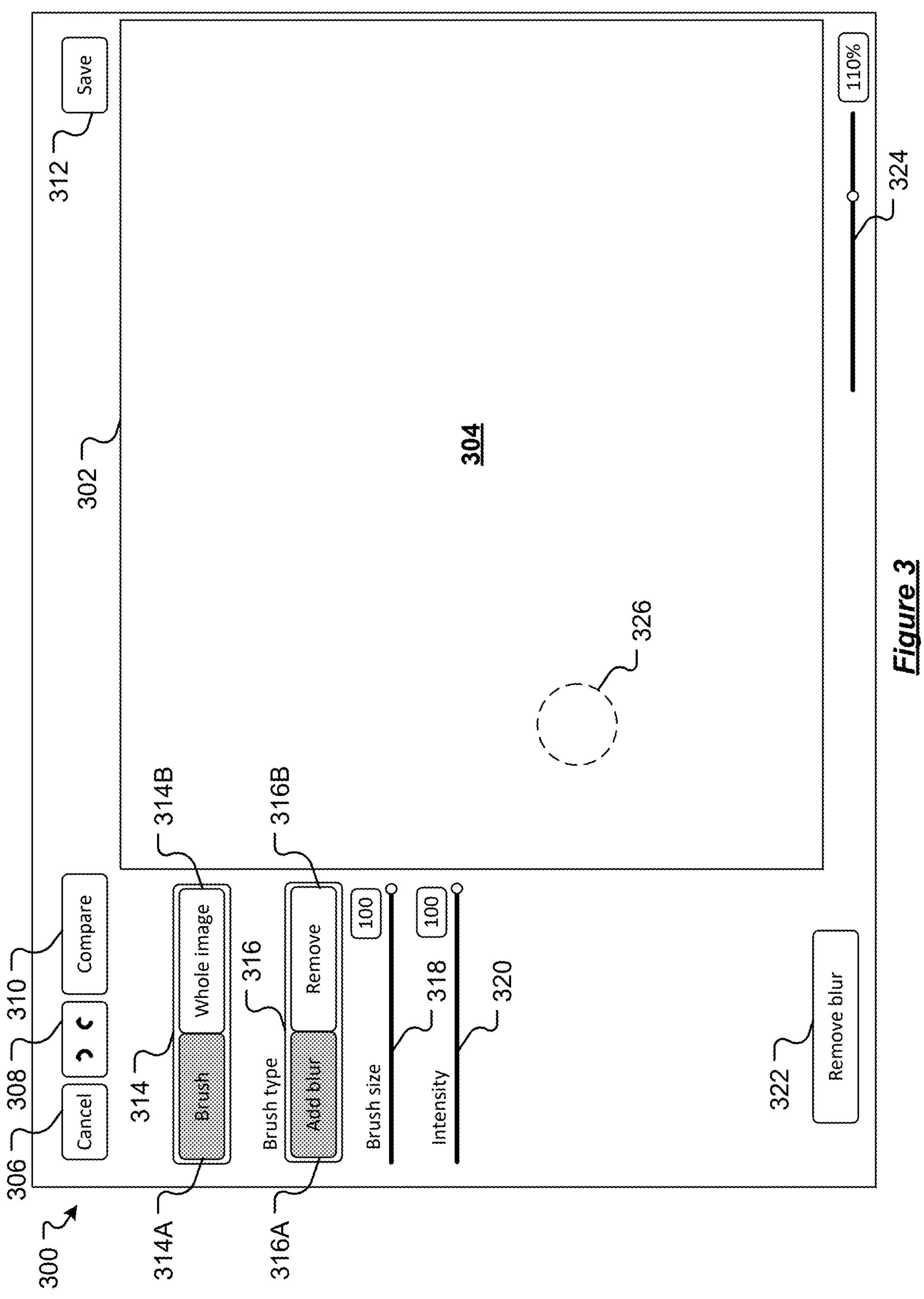
FIG. 3 depicts an example graphical user interface.

To illustrate the types of features that client application 122 may provide, FIG. 3 provides an example of a user interface, GUI 300. GUI 300 may be one such GUI of the user interface of client application 122. Client application 122 may include a variety of GUIs. The example of FIG. 3 is an example of a GUI that specifically utilises blur module 124. It will be appreciated that other GUIs may exist as part of client application 122 or other applications that may facilitate the same or similar user interaction as example GUI 300.

GUI 300 includes a preview area 302 which is used to display a digital image 304 being edited/viewed. More specifically, GUI 300 enables digital image 304 to be edited (including applying a blur effect to digital image 304) when it is displayed in preview area 302. In this example, GUI 300 further includes: a cancel control 306 which a user can interact with to navigate away from the present screen to another screen of client application 122 (for example, a general viewing screen for digital image 304); undo and re-do controls 308 which a user can interact with to undo a change (if possible) or redo an immediately undone change (if possible); a compare image control 310 which a user can interact with to access a side-by-side comparison of the original image and the presently edited image, both of which will be displayed in preview area 302 (or alternatively one or both may be displayed in a dedicated pop-up preview area); a save control 312 which a user can interact with to save the edits to image 304 to a storage location (such as data storage 118); a blur effect control 314 which a user can interact with to toggle between two blur modes, in this case using a blur brush tool (denoted by control 314A, shown in this example as presently selected) to apply a blur effect or using a general blur tool (denoted by control 314B) applying a blur effect to the entirety of image 304; a blur brush type control 316 of which a user can interact to toggle between two brush modes when the blur brush tool, in this case using a blur brush tool to applying a blur effect (denoted by control 316A, shown in this example as presently selected) or using a blur brush tool to remove a blur effect (denoted by control 316B); a brush size control 318 of which a user can interact to increase or decrease the size of the blur brush tool; a blur intensity control 320 of which a user can interact to increase or decrease the blur intensity of the blur brush tool; a remove blur control 322 of which a user can interact to remove any blur effect from image 304 (either any blur effect altogether or any blur effect applied to image 304 in a present editing session which is explained below); a zoom control 324 of which a user can interact to zoom into/out of image 304. Also shown in this example is a blur brush tool cursor 326 that is shown with the present size setting (in this example, the maximum size) such that reducing the brush size by way of control 318 will reduce the size of cursor 326. Cursor 326 moves within GUI 300 in response to an input control, such as movement of device 224 by the user. It will be appreciated that in other embodiments, the maximum brush size may be greater than that of the illustrated example.

In the present examples, to apply a blur effect to a digital image such as image 304, the user may select the desired blur effect through control 314. If the blur brush tool is selected through control 314A, blur brush tool cursor 326 will be enabled and allow the user to select and apply the blur effect using, for example, device 224 by way of a "click and drag" action. The blur effect will be applied at the brush size and blur intensity set (through the present settings of brush size control 318 and blur intensity control 320, respectively) prior to commencement of the user applying the blur effect to digital image 304 within preview area 302.

If the user selects the general blur tool through control 314B, as indicated above, the blur effect is applied to the entirety of digital image 304. The blur effect will be applied at the blur intensity set (through the present setting of blur intensity control 320) prior to commencement of the user applying the blur effect. However, if any area of digital image 304 already has blur effect applied by way of the blur brush tool, the general blur may only be applied to the area(s) of digital image 304 that have not been previously blurred either at any time or within the present editing session, or the extent of blur may be different between areas that have been previously blurred and areas that have not. The present editing session is defined as the time digital image 304 was accessed and/or last saved (for example, using save control 312). In other examples, the general blur may override any previous blur effect.

It will be appreciated that many variations on GUI 300 are possible, and a given image editing application may provide additional functions to those depicted and described. Similarly, a given image editing application may provide a GUI with a subset of the functions described above with reference to the GUI 300.

The digital images for editing (such as digital image 304) may be in a raster image format, for example .jpg, .png, .bmp, and/or any other format which represents an image as a matrix of pixels. For non-raster image formats, for example a vector graphic image, such image formats may be converted to a suitable raster image format (for example, by known conversion algorithms or applications). The digital images may be retrieved from a database (such as data storage 118) or may be stored on or imported into client system 120 (for example in memory 210) or from a remote source (for example from a networked data storage device or remote server accessed via communications interface 216 and network 130). Digital images may also have data associated with it, including pixel data (including pixel location data such as a two dimensional position, and appearance data including an appearance value) and a file name, amongst other data.

Once a digital image is accessed by a user by way of client application 122, the user may implement a blur effect on that image, referred to herein as a source image, to produce a blurred image referred to herein as an output image. The source image includes source image data which includes source pixels, for example matrix of source pixels.

For each source pixel, client application 122 has access to (or can calculate): a two dimensional position (for example an (x,y) coordinate pair mapped to the source image); and appearance value representing a colour of a source pixel (for example an sRGB or other colour space value).

The implementation of the blur effect may be performed within in a specific colour space, for example linear sRGB (which may provide more accurate colour reproduction). Where the source pixels are sRGB, the image may be converted to linear sRGB as a pre-step to implementing the blur effect. Further, after the blur effect is complete, an output (blurred) image would then be convert to sRGB such that the same colour space of the source image is outputted to the user. In other embodiments, other colour spaces may be utilised.

Figure 4:
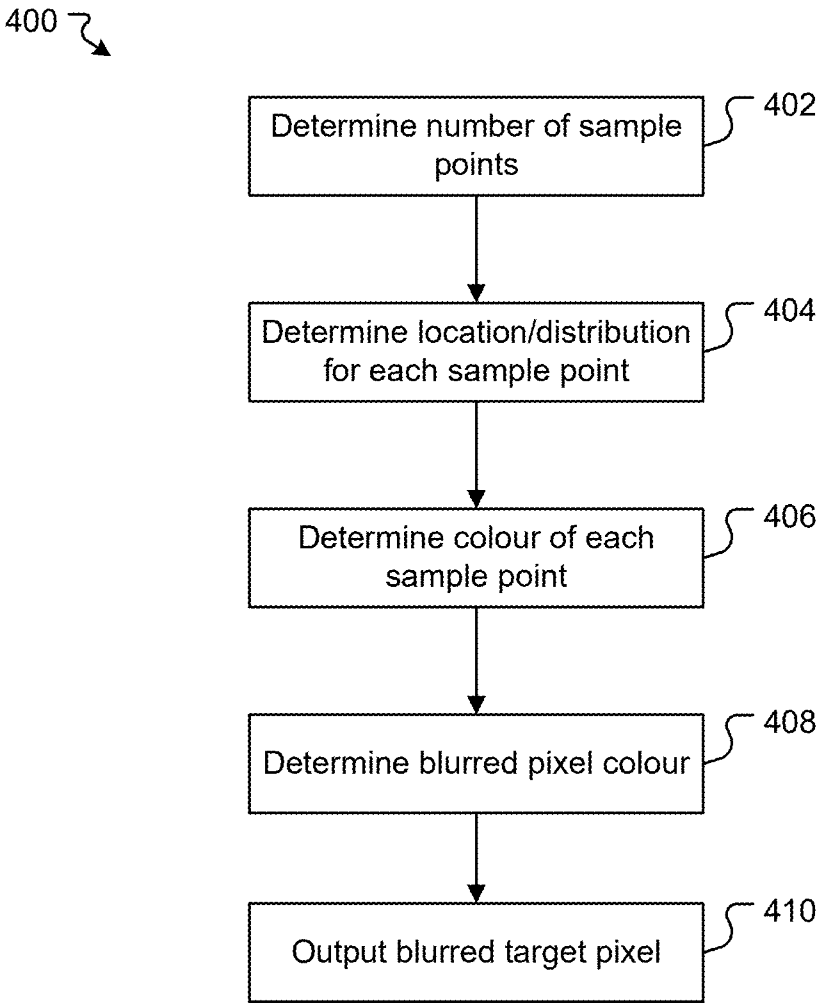
FIG. 4 depicts operations performed in a method for implementing a blur effect.

Turning to FIG. 4, a method 400 for implementing a blur effect on a first target pixel of a set of target pixels in respect of a source image will be described.

The method may be performed by a computer processing system such as system 200. In the present examples, client system 120 and/or computer processing hardware 112 are configured to perform method 400.

Where the method is performed by client system 120, it is carried out by blur module 124. In the present examples client system 120, and thus blur module 124, is software—i.e. data and computer readable instructions which are stored in memory (e.g. volatile memory 208) for execution by one or more processing units (e.g. unit 202). Generally speaking, processing is performed by a central processing unit (CPU) such as unit 202. However, in embodiments, wherein unit 202 includes a central processing unit and a graphics processing unit (GPU), processing is performed by a combination of these processing units.

Where the method is performed by computer processing hardware 112, it is carried out by server application 114 or a combination of server application 114 and data storage application 116. In the present examples server application 114 and data storage application 116 are software—i.e. data and computer readable instructions which are stored in memory (e.g. data storage 118) for execution by computer processing hardware 112. Computer processing hardware 112 may include several processors capable of server-level including one or more CPUs and/or GPUs and processing will often be performed by one or more of those processors. It will be appreciated that the processing power of the processors of computer processing hardware 112 (collectively and each individually) will generally be far greater than that of client system 120. In alternative embodiments, the blur module 124 may be (or include) a hardware module—i.e. specially configured hardware for performing some or all the operations of method 400.

In the present example, method 400 is triggered at client application 122. In particular, blur module 124 detects initiation of a blur effect. This may be detecting the user's activation of a UI control.

This activation may include the user applying a blur effect through a blur brush tool or through a general blur tool, via a GUI such as GUI 300 described with reference to FIG. 3. For example, where the blur brush tool cursor 326 is controlled by device 224 with respect to a source image, the "click and drag" action of device 224 will commence the selection of the target pixels from the source image to form a set of one or more target pixels. More specifically, all pixels over which blur brush tool cursor 326 is dragged will be selected as target pixels forming the set of target pixels. The set of target pixels will be a subset of the source pixels of the source image, or may be all the source pixels (if the blur brush tool cursor 326 is dragged over the entire source image). Where the general blur tool is applied, the target pixels selected will be all source pixels or all the source pixels except for source pixels where another blur effect has been applied in the present editing session. Again, the set of target pixels will be a subset of source pixels, or may be all the source pixels (e.g. if no blur effect has been applied in the present editing session).

Each target pixel to which the blur effect is to be implemented includes a target pixel location, which corresponds to the two dimensional position within the matrix of pixels of the source image. Whilst method 400 will generally be described in respect of a single pixel, the first target pixel, it will be appreciated that method 400 is applied to the entire set of target pixels (that is, a second target pixel, a third target pixel, a fourth target pixel and so on of the set of target pixels). Method 400 may be applied concurrently on the entire set of target pixels. In alternate embodiments, method 400 may be applied to a specific sequence of pixels or specific sequence of groups of pixels, for example a predefined number of adjacent target pixels may be concurrently processed and there will be a sequence of target pixel groups (each containing at most the predefined number of target pixels) that are sequentially processed.

On detecting triggering of method 400, blur module 124 directly or indirectly determines a sample points number, that being the number of sample points from which the blur effect for the first target pixel is generated at 402. The sample points number may be determined in a number of ways and potentially based on a variety of factors. The sample points number may be determined experimentally and set such that there is not too few so as to produce a noisy or otherwise undesirable blur and there is not too many so as to either require a high level of processing power and/or require an undesirably long time period to process the number of sample points. In other embodiments the sample points number is fixed. The number of sample points, whether variable or fixed may be the same depending on the environment in which method 400 is being performed or may be different. For example the number of sample pixels may be higher when method 400 is performed by server application 114 relative to the number of sample points when the method is performed by client application 122.

In some embodiments, the sample points number for a given target pixel depends on a blur sample area within which the sample points are located. The blur sample area is an area on the source image that includes the target pixel location. The target pixel location may be at or substantially close to a central point of blur sample area. For example, when a Gaussian blur is being applied, the blur sample area may be a circular area where the target pixel location is at the central point of the circular area. The size of the circular area may, for example, be one standard deviation of the Gaussian function. In other examples, the size of the blur sample area will be other than a one standard deviation circle, such as a two standard deviation circle around the target pixel location. It will be appreciated that in other embodiments, depending on the style of blur effect that is to be implemented (i.e. for blur effects other than a Gaussian blur), the blur sample area may be other than circular.

The size of the blur sample area will vary based on intensity of the blur effect being applied. Generally speaking, the greater the blur intensity, the greater the blur sample area. For example, for a more intense blur a one standard deviation circle area will be greater in actual size (in respect of the source image) than the actual size blur sample area of a one standard deviation circle area for a less intense blur. Therefore, the lesser the blur intensity, the smaller the blur sample area. Blur module 124 will also scale the sample points number based on the size of the blur sample area. Therefore, for a smaller blur sample area, a lesser number of sample points will be required compared to a larger blur area. For example, as a comparison: for a blur intensity of 10, a blur sample area of a one standard deviation circle equates to 30 sample points; and for a blur intensity of 80, a blur sample area of a one standard deviation circle equates to 255 sample points. As previously described, the intensity of the blur effect may be selectable by a user, for example using the blur intensity control 320 of GUI 300 of FIG. 3.

In yet other embodiments, the user (by way of client application 122) may manually set the blur sample area through controls on GUI 300, such as a control of a blur sample area scaling factor. The blur sample area scaling factor is a value that impacts the maximum sampling area that is calculated for a given target pixel and, therefore, the blur effect generated by method 400. In some implementations, the blur sample area scaling factor may be a user defined variable. In other implementations, the blur sample area scaling factor may be defined in other ways. In the context of the processing and calculations described below, a blur sample area scaling factor value within a range of 0 to 1 will typically be appropriate (although alternative values may be used).

When defined by the standard deviation, the blur sample area will also vary based on the size of the digital image, in terms of the matrix of pixels of that image. That is, for a larger image (e.g. 1000 pixels by 1000 pixels), the blur sample area of a one standard deviation circle area around a pixel will be greater than the blur sample area of a one standard deviation circle area around a pixel for a smaller image (e.g. 100 pixels by 100 pixels). Therefore, the smaller the image, the smaller the blur sample area and thus a lesser number of sample points will be required. '1 standard deviation' may be defined by the shape of the Gaussian lobe (i.e. function) that is used. More specifically, '1 standard deviation' may be defined by a certain percentage of the 'width' of the Gaussian lobe. Therefore, specifying the size in pixels of 1 standard deviation may fully describe the Gaussian function used in the sampling for a pixel. The size in pixels of '1 standard deviation' may be dependent on the image size because the pixel size is scaled based on a longest side (so that it is a uniform percentage of the image size, and therefore will look consistent at different resolutions). In other embodiments, the pixel size may be scaled based on a shorter side.

In examples where the blur sample area scaling factor is utilised, a normalised blur scaling factor, for example a blur radius, may be calculated based on the longest side of the image (either the width or height) being processed—for example:

$$\text{blur\_radius} = \text{intensity} * \text{max\_blur\_radius} * \text{maximum}(\text{image\_width}, \text{image\_height})$$

The number of sample points may be set having regard to the processing resources available. For example, the number of sample points may vary between about 15 and about 3000. Lower numbers may be utilised when there are relatively low processing resources available. For example when the client system 120 is performing the method and the client system 120 is a mobile device like a smartphone. Similarly higher numbers may be utilised when higher processing resources are available, for example when computer processing hardware 112 of server environment 110 performs the method.

In some embodiments both a client system (for example, client system 120) and a server system (including, for example, server environment 110) perform the method. The client system may perform the method responsive to user input at the client system using a relatively lower number of sample points and display the result. Due to the relatively low number of sample points, the client system may display the result relatively quickly. The server system may perform the method responsive to a request from the client system using a relatively high number of sample points. The result of processing by the server system may be provided to the client device and displayed to the user at a later time. The processing by the server system may be requested by the client device as a result of the same user input that caused the client system to perform the method (i.e. both processes are in parallel), or as a result of another user input. An example of another user input that may result in a request to the server system is an input requesting a save operation (e.g. by selecting save control 312 in GUI 300), to save an image that has been blurred.

For example, where client system 120 performs the method, the sample points number may be between about 10 and 400, between about 15 and 300 or between about 30 and 255. Where computer processing hardware 112 performs the method, the sample points number may be between about 400 and 2000, or between about 500 and 1500. The greater sample points number for computer processing hardware 112 simply indicates the greater processing power of computer processing hardware 112 compared to client system 120 as well as the timing required to generate the blur effect being less of a priority for computer processing hardware 112 compared to client system 120. This is because, client system 120 can provide an indicative result to a satisfactory standard for visual inspection by the user (in terms of image quality/quality of blur effect) whilst computer processing hardware 112 computes a superior quality blur effect for the actual digital image that is stored.

In other examples, the sample points number may be determined based on a user selection, for example using a specific control (not shown, but could be a slider type control or a text box to manually enter a number) on GUI 300. For example, if the user only wishes to generate a low quality blur effect, then a sample points number can be set at a relatively low number. If, on the other hand, the user wishes to generate a high quality blur effect, then a sample points number can be set at a relatively high number. In these examples, a minimum and/or maximum sample points number may be set as values that respectively define a minimum and a maximum sample points number that will be used in method 400. This may be provided as a user defined variable.

The sample points number may also be automatically set based on the processing power of the processing unit (or units) which is performing the blur effect, such as processing unit 202. For example, there may be defined in client application 122 a predefined optimal sample points number for any given processing power of the processing unit(s). Client application 122 may automatically detect the processing power of the hardware and then automatically set the sample points number to a predefined optimal number of sample points for the processing power detected. In other examples where client application 122 automatically detects the processing power of the hardware, the hardware may then be classified into predefined bands of power of hardware, for instance a "low power" band, a "medium power" band and a "high power" band. For each of these bands, there will be a predefined sample points number that will be associated with each band, for example 30 to 250 sample points for the low power band, 250 to 500 sample points for the medium power band and 500 to 1500 sample points for the high power band.

Once the sample points number is determined, at 404 client application determines the location of each of these sample points. In other words, blur module 124 determines the distribution of the sample points as located in the blur sample area. The sample point location determination is dependent on the type of blur effect that is being applied. Thus, blur module 124 determines a specific distribution of sample point locations for a desired type of blur effect. For example, to apply a box blur effect, a uniform distribution of sample points would be appropriate, and to apply a radial blur effect, a uniform distribution in the polar coordinate space (one axis for radius and one axis for angle) of sample points would be appropriate.

Figure 5:
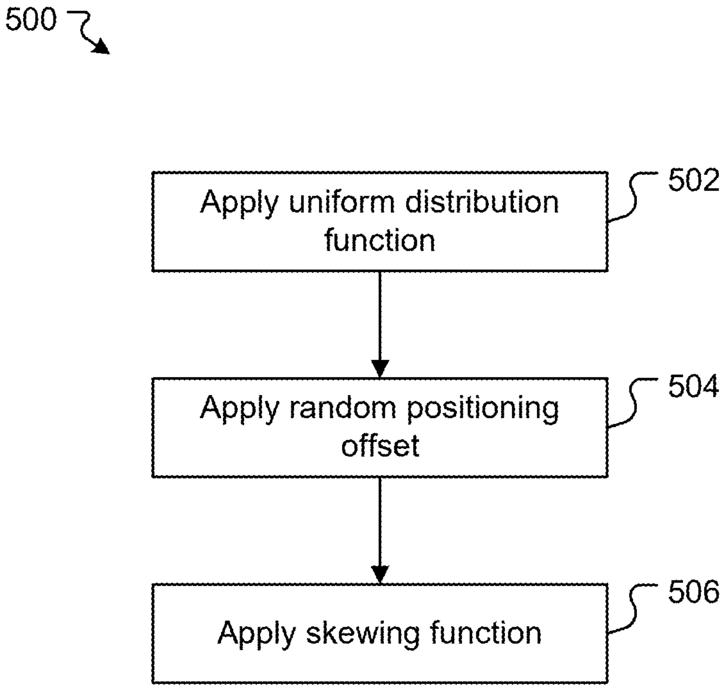
FIG. 5 depicts operations performed in a method for determining the location of sample points.

Referring to FIG. 5, an example method 500 for determining a location of each sample point will be described, for embodiments where a Gaussian blur effect being applied.

Figure 6A:
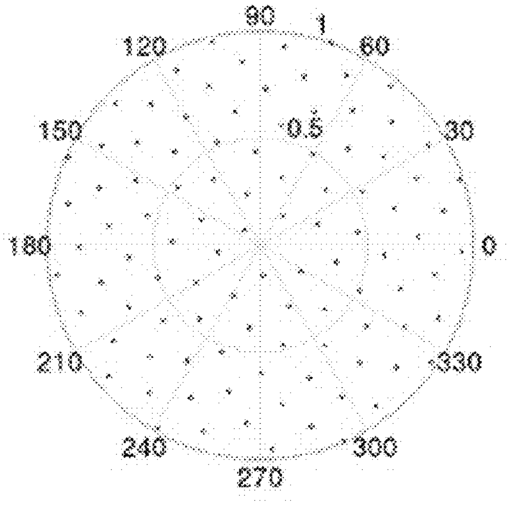
FIGS. 6A and 6B depicts example location distributions of sample points.

At 502, blur module 124 distributes the sample points about the blur sample area in a uniform fashion. This is done by applying a uniform distribution function to the set of sample points. The uniform distribution function locates each sample point so as to produce an unstructured but uniformly distributed sample points within the blur sample area, for example, a Fibonacci function to produce a Fibonacci spiral pattern distribution of points. An example of such a distribution is shown in FIG. 6A. In other embodiments, the uniform distribution function may provide a "blue noise" pattern distribution of points or a sparse grid distribution of points.

After the uniform distribution function is applied, at 504, blur module 124 randomly offsets the entire distribution of sample points within the blur sample area, whilst maintaining the locations of each sample point with respect to each other. This is done by applying a random positioning offset to the distribution of sample points. In the present examples, the random positioning offset rotates the distribution of sample points by a random degree, that is, rotates the distribution within the circular blur sample area about a central axis at the central point of the circular blur sample area. This randomises the actual location of each sample point within the blur sample area whilst maintaining the uniform distribution of the sample points with respect to each other, that is, the Fibonacci spiral pattern of sample points is maintained. In other embodiments, the random positioning offset may randomise the location of point in other ways such that the uniform distribution is maintained (for example, through adding a random jitter to each sample point). In embodiments in which the uniform distribution function already provides random locations of the sample points, step 504 may be omitted.

After the random positioning offset (if any) is applied, at 506, blur module 124 skews the distribution of sample points within the blur sample area such that they are more concentrated in the centre of the blur sample area. As stated above, for a Gaussian blur, the centre of the blur sample area aligns with the target pixel location. This is done by applying a skewing function to the distribution of sample points. In the present examples, the skewing function locates each sample point such that the overall pattern has a central skew towards the target pixel, for example according to a Gaussian distribution (a 2D Gaussian function) of the sample points within the blur sample area. This forms a final skewed distribution of sample points. The location of each sample point is referred to as a location offset. The location offset is recorded in respect of the target pixel location. For example, where the target pixel location is mapped to an (x,y) coordinate pair of (0,0), each location offset once is stored (for example in volatile memory 208) as a mapped (x,y) coordinate pair with respect to (0,0).

Figure 6B:
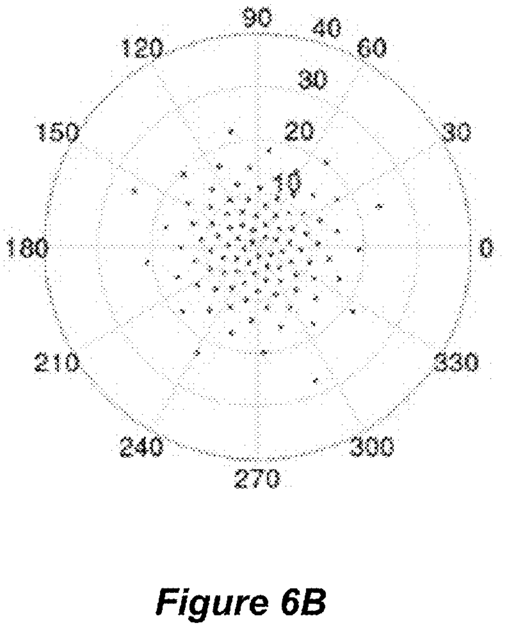

One example skewing function is an inverse normal cumulative distribution function which yields the skewed distribution of sample points shown in FIG. 6B. This example shows a distribution based on a 2D Gaussian distribution with a mean of 0 (corresponding to the location of the single pixel on the source image to which the blur effect is being applied) and a covariance where the standard deviation in the horizontal (x) dimension equals the standard deviation in the vertical (y) dimension both of which equal the blur standard deviations. In some instances, there may be an error (for example, a centre skew of approximately 10%) that is introduced during the process such that the target standard deviations are not exact standard deviations. This error may be substantially corrected by multiplying the standard deviations by a predetermined fixed constant.

Further, where an inverse normal cumulative distribution function is used, prior to it being applied, a radius value may be remapped from a range of [0,1] to [0.5,1] as only the positive side of the distribution is required.

After determining the location of each sample point, referring back to FIG. 4, at 406 blur module 124 determines an appearance value for each sample point, that is a colour of each sample point. This determination may be, or may be based on, the appearance value of the source pixel at or at and around the location of each sample point.

In some embodiments, each sample point is specified at a sub pixel accuracy. In other words, coordinates of each sample point may be such that they fall between coordinates having a pixel level accuracy. For example, pixel level accuracy may have coordinates such as (1,1), (2,6), etc. where using this level of accuracy would place a sample point exactly at a single source pixel coordinate location. In contrast, sub-pixel accuracy may have coordinates such as (0.5,0.5) which is a point at the midpoint of source pixels at (0,0), (0,1), (1,0) and (1,1). As such, the location of the sample point may also be close to one or more source pixels that surround the source pixel in which the sample point is located.

As mentioned above, in some embodiments the determined appearance value for each sample point may match an appearance value at the sample point, for example the appearance value for a source pixel that represents the sample point or contains the sample point. In other embodiments, blur module 124 determines the colour of a sample point based on the colour of the source pixel at the location of that sample point as well as one or more source pixels that are closest to the location of that sample point.

In embodiments where the colour of each sample point is determined based on the appearance value of the source pixels that are closest to the location of that sample point (including the source pixel at the location of the sample point), the number of closest source pixels of which contribute to the sample point colour may be based on the process of calculating the sample point colour. An interpolation technique may be used to calculate the sample point colour based on the number of closest source pixels, for example bilinear interpolation. In this example, the sample point colour is based on the closest four pixels to the sample point, given the sub pixel location of the sample point is such that it may not correspond exactly to a source pixel. The criteria of a source pixel being closest to the location of the sample point may be determined based on a linear distance of the coordinate location of a source pixel from the coordinate location of the sample point.

In embodiments using bilinear interpolation, after the closest source pixels are determined, blur module 124 observes the appearance values of each of the closest source pixels. This may be achieved by accessing the source image data and extracting this information. The observed appearance values of each of the closest source pixels are blended by way of bilinear filtering based on the location of the sample point relative to each of the closest source pixels (or other appropriate techniques) to determine the colour of the sample point. Bilinear filtering essentially blends the appearance values by determining a weighted average of the appearance values of the closest pixels based on distance from the location of the sample point. More specifically, the source pixel closest to the sample point is given the greatest weight, the next closest source pixel given the next most weight, the next closest source pixel given the next most weight, and so on. The weightings may be specifically calculated by blur module 124 based on actual linear distances of each source pixel to the location of the sample point.

It will be appreciated that, with respect to Gaussian blur, the use of bilinear interpolation removes any inherent central bias due to the large number of sample points close to the target pixel location—i.e. the centre of the Gaussian lobe. For instance, taking the colour of the source pixel closest to the sample point location would result in a Gaussian blur that is centre skewed.

In other embodiments using techniques other than bilinear interpolation, the combining of source pixel appearance values may be done by taking an average (non-weighted) of the appearance values of the closest source pixels.

Figure 7:
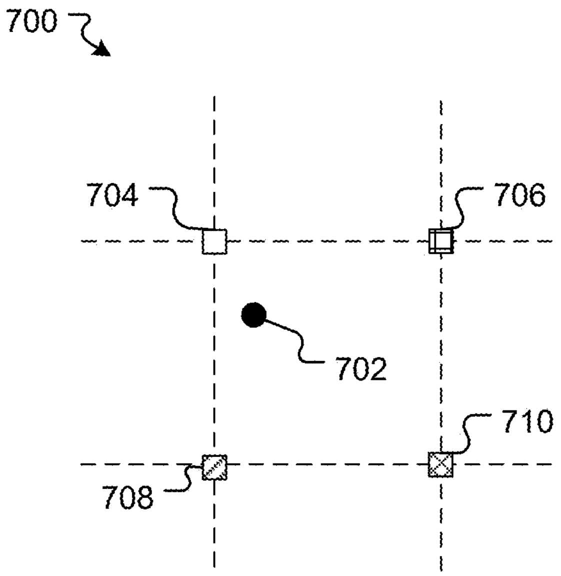
FIG. 7 depicts a schematic example of a sample point located on a source image.

FIG. 7, which shows a schematic example of a portion of a source image 700 with a sample point 702 shown at a location overlaying image 700. Image 700 includes four pixels, 704, 706, 708 and 710. Pixel 704 is disposed adjacent other pixels of image 700, where pixel 706 is disposed to the right of pixel 704, pixel 708 is disposed above pixel 704, and pixel 710 is disposed adjacent pixels 706 (above pixel 710) and pixel 708 (to the left of pixel 710) such that pixel 710 is directly diagonally disposed to pixel 704 (to the top right of pixel 704). It will be appreciated that there may be other pixels adjacent to the illustrated pixels such that pixels 704 to 710 are a subset of pixels of image 700. Blur module 124 determines that pixels 704 to 710 are the four closest pixels and then proceeds to observe the appearance value of each of these pixels. Blur module 124 then calculates the colour of sample point 702 based on the appearance values of these pixels, giving the greatest weight to the appearance value of pixel 704, the next greatest weight to the appearance value of pixel 708, the next greatest weight to the appearance value of pixel 706, and the least weight to the appearance value of pixel 710.

In alternative embodiments, where central bias is of a lower concern or is not inherent in the distribution of sample points, blur module 124 may determine the colour of each sample point by observing the appearance value of the source pixel that is closest to the location of each sample point and simply taking that appearance value as the colour of that sample point. Again, using the example illustrated in FIG. 7, in this alternative embodiment, blur module 124 observes the appearance value of pixel 704 which is closest to the location of sample point 702 and the appearance value of pixel 704 is taken as the colour of sample point 702.

In other embodiments, the colour of a sample point may be calculated based on techniques that may use a number of sample points other than four. In yet other embodiments, the number of closest source pixels of which the sample point colour is based may set by the user or be otherwise determined by blur module 124. Further, the criteria of a source pixel being closest to the location of the sample point may be determined in a number of ways based on a linear distance of a source pixel from the location of the sample point.

Step 406, as described for a single sample point, may be applied concurrently on all sample points. In alternate embodiments, step 406 may be applied in a specific sequence of sample points or specific sequence of groups of sample points, for example a predefined subset of sample points may be concurrently processed and there will be a sequence of subsets (each containing at most the predefined number of sample points) that are sequentially processed.

As the colour of each sample point is determined, blur module 124 stores the determined colour (for example in volatile memory 208) in respect of each sample point After determining the colour of each sample point, at 408 blur module 124 determines a first blur appearance value, that is a blurred pixel colour. This determination is based on the determined colours of each of the sample points. Specifically, for a Gaussian blur effect, blur module 124 takes an average of the colours of all the sample points. This calculation of the average colour of each sample point without any further weighting is adequate for producing a relatively high quality Gaussian blur effect given the way blur module 124 determines sample point locations at 404 and determines the colour of the sample points at 406.

Namely, there is a higher density of sample points closer to the target pixel location, thus the source pixels closest to the target pixel location more greatly influencing the blurred pixel colour. Conversely, the further away a source pixel is from the target pixel location, the lesser the influence on the blurred pixel colour. An unskewed distribution (for example, if 506 is removed) would give generally equal influence to the source pixels within the blur sample area which would lead to a lower quality blur having more variance (noise) between adjacent pixels for the same number of samples. In the case of an unskewed distribution, further processing may be applied to obtain a better quality blur effect, for example Gaussian weights may be applied to the blurred pixel colour.

Once the blurred pixel colour is determined, at 410, blur module 124 outputs a first output pixel of the determined blurred pixel colour. This may include overwriting the pixel data associated with each source pixel corresponding to each the target pixel, that is replacing the source pixel with the first output pixel. In other embodiments, this may include overlaying the first output pixel over the corresponding source pixel, thus maintaining the pixel data of the source pixel. The appearance to the user will be the same in both cases. Referring to example GUI 300, the source pixel on image 304 corresponding to the target pixel will appear as the first output pixel.

It will be appreciated that blur module 124 may carry out 410 directly after 408. As stated above, method 400 is then or concurrently applied in respect of all target pixels. However, blur module 124 may also carry out 402 to 408 for all target pixels and then carry out 410 as a single step for all target pixels once the blurred pixel colour is determined for each target pixel. In this latter case, the blurred pixel colours may be temporarily stored (for example in volatile memory 208) until blur module 124 carry outs 402 to 408 for all target pixels, after which blur module 124 retrieves the stored blurred pixel colours for outputs output pixels for all target pixels.

It will be appreciated that each output pixel corresponds to a target pixel, which is a source pixel. Each output pixel shares the same pixel location data as its corresponding source pixel. Method 400 is described as processing each and every target pixel to generate a corresponding output pixel. It may be possible, however, to process a subset of target pixels to generate corresponding output pixels. In this case other target pixels may be ignored (effectively converting the image to a lower resolution) or may be processed according to a different algorithm.

Once all output pixels have been outputted (that is, 410 completed in respect of all target pixels), the blur effect is complete. Accordingly, blur module 124 finalises an output image (which is composed of the output pixels along with any source pixels which were not target pixels and thus not changed) and outputs that image. Blur module 124 may output the output image in various ways, for example by rendering the output image on a display (for example, in preview area 302), communicating the output image to another application (running on system 120 or an alternative system), and/or by any other appropriate output mechanism.

In some embodiments, where client system 120 performs method 400, a visual appearance to the user will be such that the blur effect is being applied to the digital image in real-time or near real-time. This is enabled mainly (but not exclusively) due to the sample points number determined at 402 being such that the processing of those sample points by client system 120 can occur in real-time or near real-time. Therefore, when the user is applying the blur effect by way of the blur brush tool, method 400 is commenced progressively as the blur brush tool is selecting target pixels. Where the user applies the blur effect to the entire image by way of the general blur tool, all the target pixels are selected at once.

In the cases where both the general blur and blur brush tool are used on an image, two components of blur intensity are calculated for a given pixel: a local blur intensity value which may be a sum of the blur intensity in respect of the use of the blur brush tool (that is, the sum of the blur brush strokes over the given pixel); and a global blur intensity value which may be the blur intensity in respect of the use of general blur. The two blur intensity values are combined as set out below to provide the actual blur intensity value that will applied to the given pixel.

Taking an example where a blur intensity may be defined by an integer between 0 and 1 and an image has a starting image blur intensity value ($I_S$) of 0.5. If the local blur intensity value ($I_L$) is less than or equal to 0.5, the actual blur intensity value ($I_A$) will be the local blur intensity value as a portion of 0.5 multiplied by the global blur intensity value ($I_G$). The calculation of the actual blur intensity value is as follows:

$$I_A = I_G \times (I_L/0.5), \text{ when } I_L <= 0.5 \qquad \text{EQ(1)}$$

For example, if the local blur intensity value is 0.25 this is 50% of 0.5. Therefore, the global blur intensity value is multiplied by 0.5 (i.e. 50%).

However, if the local blur intensity value ($I_L$) is greater than 0.5, then the actual blur intensity value ($I_A$) will be a blended value based on the local blur intensity value minus 0.5 as a portion of 0.5. The calculation of the actual blur intensity value is as follows:

$$I_A = I_G \times [1 - (I_L - 0.5)/0.5] + 1 \times (I_L - 0.5)/0.5, \text{ when } I_L > 0.5 \qquad \text{EQ(2)}$$

For example, if the local blur intensity value is 0.9, subtracting 0.5 leaves 0.4, which is 80% of 0.5. Blending based on the 80% includes calculating a weighted average. In this example, the actual blur intensity value will be the weighted average of the global blur intensity value weighted at 0.2 (i.e. 20%) and a value of 1 weighted at 0.8 (i.e. 80%).

The resultant actual blur intensity is then linearly mapped between a Gaussian blur standard deviation of 0, and an upper bound standard deviation size. The upper bound may be the largest standard deviation size that is supported by the specific systems utilised.

If, for example, the global blur intensity value is 0, only pixels having a blur intensity greater than 0.5 are blurred (based on EQ(1) above for a local blur intensity value less than or equal to 0.5, the actual blur intensity value is based on a multiple of the global blur intensity value, which is 0).

If, for example, the global blur intensity value is 0.5, no further blurring occurs and the local blur intensity value is applied without modification (based on EQ(1) above for a local blur intensity value less than or equal to 0.5, the actual blur intensity value ($I_A$) would equal is the local blur intensity value ($I_L$)).

If, for example, the global blur intensity value is 0.75, starting image blur intensity value ($I_S$) of 0.5 is changed to a value of 0.75. This results in pixels having a blur intensity less than 0.5 (that is, 0 to 0.5) being translated such that they are mapped to an intensity range of 0 to 0.75 and pixels having a blur intensity greater than 0.5 (that is, 0.5 to 1) being translated such that they are mapped to an intensity range of 0.75 to 1.

If, for example, the global blur intensity value is 1, starting image blur intensity value ($I_S$) of 0.5 is changed to a value of 1. This results in only pixels having a blur intensity less than 0.5 (that is, 0 to 0.5) being translated such that they are mapped to an intensity range of 0 to 1. Therefore, pixels with an initial intensity less than 0.5 will have the blur intensity reduced and pixels with an initial intensity greater than 0.5 are not changed.

The output image will not be permanently saved until the user interacts with the save control 312.

As described above, in some embodiments, a user can interact with the save control 312 to save the image currently displayed in the preview area 302—for example, after applying one or more blur effects via blur effect control 314. Activation of the save control 312 may cause client application 122 to launch a save image user interface which allows a user to select a save location and/or other image parameters (for example, an image format, an image quality, an image size, and or other parameters). The save image interface will cause blur module 124 to communicate to server application 114 (and/or other applications) for computer processing hardware 122 to initiate method 400 (to generate and save a high quality version of the output image outputted by client system 120). The save image interface may allow a user to save the image to locally accessible memory (e.g. non-transitory memory 210 or other memory directly accessible to system 200) and/or a remote location (e.g. a location accessible over a communications network such as 130).

After the output image is outputted, prior to interacting with the save control 312, the user may interact with the cancel control 306 to discard all changes made during the present editing session. If a series of discrete blur effects have been applied, the user may interact with the undo and re-do controls 408 to remove the latest change (that is, revert to the image prior to the last change) or, following at least one "undo" change, redo a immediately undone change (that is, re-apply the last change that was removed).

In some embodiments where computer processing hardware 112 performs method 400, a higher quality blur effect using a comparatively high number of sample points will be determined to generate higher quality version of the output image outputted by client system 120. In this case, there is a lesser emphasis on processing time and a greater emphasis on producing a high quality blur effect that will be saved as a primary version of the output image. Therefore, more sample points are used to create a high quality blur effect and the time taken to generate the high quality blur effect may be far in excess of near real-time. In preferred embodiments, the generation of a blur effect by computer processing hardware 112 may be in the order of about 350 to 600 milliseconds, or in the order of about 400 to 500 milliseconds. However, further steps are often required that increase the overall processing time, for example downloading of files. Thus, the output images of client system 120 and computer processing hardware 112 are applying the same (overall) blur effect(s) but in the latter case at a higher quality. Once computer processing hardware 112 outputs the output image it is immediately saved, for example, by data storage application 116 in data storage 118.

It will also be appreciated that the intensity of the blur effect can be different across different parts of a digital image. For example, a user may set the blur intensity of the blur brush tool to a first intensity level and apply a first intensity level blur to a portion of the digital image, and then subsequently set the blur intensity of the blur brush tool to a second intensity level (different the first level) and apply a second intensity level blur to another portion of the digital image, thus creating an output image having variable blur intensities at different portions of the output image. Therefore, different blur intensities may be applied but at different times, as part of different actions (for example, a first action being first intensity level blur to a portion of the digital image, a second action being second intensity level blur to another portion of the digital image). Where computer processing hardware 112 performs method 400 and all the target pixels are selected at once, corresponding blur effects of different intensities at various portions will be carried out as a single action (for example, applying the corresponding first and second intensity level blurs as one action).

In embodiments, following the finalisation of a blur effect on an image, that blurred image may be re-blurred or re-edited. The finalisation of the blur effect may be when the output image is outputted or when the output image is saved. To allow for this re-blurring or re-editing of blurred images, the source image may be stored for example in one or more of data storage 118 and non-transitory memory 210. Further, blur parameters may also be stored for example in one or more of data storage 118 and non-transitory memory 210. Blur parameters includes data in respect of the blur intensity of each pixel such that the stored source image and stored blur parameters may be used to generate the blurred image at any time. The blur parameters collectively provide instructions for blurring the source image in accordance with how the user blurred the image to form the output image. The stored blur parameters may be used themselves at any time after the user finalises the desired blur effect, or a portion or more of the stored blur parameters may be replaced by different blur effects or edits that are later desired by the user.

In some embodiments, a user can interact with the save control 312 to save the image currently displayed in the preview area 302—for example, after applying an artificial depth of field effect to an input image selected via control 606. Activation of the save image control 608 may cause the image editing application to launch a save image user interface which allows a user to select a save location and/or other image parameters (e.g. an image format, an image quality, an image size, and or other parameters). The save image interface may allow a user to save the image to locally accessible memory (e.g. non-transitory memory 210 or other memory directly accessible to system 200) and/or a remote location (e.g. a location accessible over a communications network such as 130).

While not shown, additional controls for outputting the image in alternative ways may be provided. For example, one or more share controls may be provided allowing a user to: launch a communications application and attach the image to an electronic communication (e.g. email, instant message, short message service, other application); electronically publish the image to a social media site or other media sharing website); and/or to share the image via other mechanisms. As a further example, a print control may be provided allowing the user to specify print parameters and send the image to a local or network accessible printer. The printer then prints the image on a printed product. The printed product may be any appropriate product, e.g. a printed photograph, a poster, a book, a banner, a keyring, coffee cup, a magnet, a decal, a sticker, an item of clothing, and/or any other product onto which an image may be printed.

It will be appreciated that in examples herein, blur module 124 is an integral/native part of client application 122. However, in other embodiments, blur module 124 is a plug-in or add-on to client application 122. In yet other embodiments, blur module 124 and client application 122 are entirely separate software applications. In these embodiments, blur module 124 and client application 122 may run on separate computer processing systems that communicate with one another over one or more communications networks such at 130. In this case, blur module 124 and client application 122 may communicate with each other by any appropriate communication protocol (for example, http, https, defined API calls, or any other suitable protocol). Where blur module 124 and client application 122 are separate, client application 122 may be configured to communicate the source image and relevant data (such as the set of target pixels, the type of blur effect, the blur intensity etc.) to blur module 124. Blur module 124 then performs the relevant processing (for example, method 400 described above) and communicates the output image back to client application 122. Client application 122 then displays the output image, for example in the image preview area 302.

The flowchart of FIGS. 4, 5 and 7 define operations in a particular order to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense. For example, a first target pixel could be termed a second target pixel or vice versa without departing from the scope of the described examples. Furthermore, when used to differentiate elements or features, a second feature could exist without a first feature. For example, a second target pixel could be selected/considered before a first target pixel (or without a first target pixel ever being selected/considered).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
   - accessing source image data defining a set of source pixels for an image;
   - selecting a first target pixel from a set of one or more target pixels, the set of one or more target pixels corresponding to one or more unique source pixels of the set of source pixels; and
   - generating a first output pixel corresponding to the first target pixel by:
     - determining a set of sample points having a sample point distribution within a blur sample area corresponding to an area of the image, and applying a skew to a uniform distribution of the sample points to result in the sample point distribution having a central skew towards the first target pixel such that the sample points in the sample point distribution are more concentrated in the centre of the blur sample area;
     - determining a set of sample point appearance values based on the sample points and the image;
     - determining a first blur appearance value based on the set of sample point appearance values; and
     - generating the first output pixel based on the first blur appearance value.

2. The computer implemented method of claim 1, wherein applying the skew includes applying a skewing function in the form of an inverse normal cumulative distribution function.

3. The computer implemented method of claim 1, wherein the uniform distribution function is a Fibonacci function.

4. The computer implemented method of claim 1, wherein the step of determining the set of sample points includes applying a random positioning offset to the set of sample points for determining the sample point distribution.

5. The computer implemented method of claim 4, wherein the random positioning offset includes rotating the distribution of sample points by a random degree.

6. The computer implemented method of claim 1, wherein the sample point distribution is at least in part a Gaussian distribution.

7. The computer implemented method of claim 1, wherein determining the set of sample point appearance values includes:

determining, for each sample point, a respective sample point colour based on a location of the sample point with respect to the set of source pixels.

8. The computer implemented method of claim 7 wherein determining the first blur appearance value based on the set of sample points includes:

averaging the sample point colour of each of the set of sample points.

9. The computer implemented method of claim 1, wherein determining the set of sample points includes directly or indirectly determining the number of sample points in the set of sample points, wherein the determination is in part based on a computer processor implementing the method.

10. The computer implemented method of claim 1, including the further steps of:

selecting each of the target pixels from the set of one or more target pixels; and for each target pixel, generating a respective output pixel corresponding to each target pixel by:

determining a set of sample points having a sample point distribution within a blur sample area corresponding to an area of the image, wherein the sample point distribution has a central skew towards the respective target pixel;

determining a set of sample point appearance values based on the sample points and the image;

determining a blur appearance value based on the sample point appearance values; and generating the respective output pixel based on the blur appearance value.

11. A computer implemented method for blurring an image defined by a set of source pixels, the method including:

at a first computer processing system, in response to a first user action received by the first computer processing system repeatedly performing the method of claim 1 for the set of target pixels, wherein the set of sample points is a first set of sample points; and at a second computer processing system, in response to a first user action received by the first computer processing system repeatedly performing the method of claim 1 for the set of target pixels, wherein the set of sample points is a second set of sample points and wherein the second set of sample points is greater in number than the first set of sample points.

12. A computer processing system including:

a processing unit; and a non-transitory computer-readable storage medium storing instructions, which when executed by the processing unit, cause the processing unit to perform a method according to claim 1.

13. A non-transitory storage medium storing instructions executable by a processing unit to cause the processing unit to a method according to claim 1.

14. A printed product including an output image printed thereon, the output image generated in accordance with a method according to claim 1.

15. A computer implemented method including:

accessing source image data defining a set of source pixels for an image;

selecting a first target pixel from a set of one or more target pixels, the set of one or more target pixels corresponding to a unique source pixel of the set of source pixels; and generating a first output pixel corresponding to the first target pixel by:

determining a set of sample points having a sample point distribution within a blur sample area corresponding to an area of the image, and applying a skew to a uniform distribution of the sample points to result in the sample point distribution having a central skew towards the first target pixel such that the sample points in the sample point distribution are more concentrated in the centre of the blur sample area;

determining a set of sample point appearance values based on the sample points and the image;

determining a first blur appearance value based on the set of sample points; and generating the first output pixel based on the first target pixel and the first blur value.

16. A computer implemented method for blurring a source image defined by a set of source pixels, the method including:

for each of a plurality of pixels in the set of source pixels generating an output pixel by:

for a plurality of sample points having a sample point distribution about a respective pixel wherein the sample point distribution has a central skew towards the respective pixel resulting from a skew being applied to a uniform distribution of the sample points such that the sample points in the sample point distribution are more concentrated in the centre of the blur sample area, wherein the sample point distribution is determined based on a type of blur to be applied to the source image, and wherein determining the plurality of sample points includes applying a random positioning offset to a distribution function:

determining a sample point appearance value for each said sample point, wherein the sample point appearance value for a sample point is, or is based on, a pixel appearance value for each of one or more pixels in the set of source pixels that are located at or near that sample point;

determining a first blur appearance value based on the sample point appearance values; and generating the output pixel based on the first blur appearance value; and forming a blurred image using the generated output pixels;

wherein the sample point distribution about the respective pixel spans an area of the source image and the pixels corresponding to the sample points are less than all the pixels in the area.

17. The computer implemented method of claim 16, wherein the sample point appearance value for a sample point is based on a pixel appearance value for each of a plurality of source pixels that are located at or near that sample point.

18. The computer implemented method of claim 17, wherein the sample point appearance value for a sample point is an interpolation of a pixel appearance value for each of the plurality of source pixels that are located at or near that sample point.

* * * * *